United States Patent [19]

Takao

[11] Patent Number: 5,214,543

[45] Date of Patent: May 25, 1993

[54] PORTABLE AUDIO APPARATUS HAVING A POWER SAVINGS DEVICE

[75] Inventor: Hideo Takao, Suwa, Japan

[73] Assignee: Seiko Epson Corporation, Tokyo, Japan

[21] Appl. No.: 837,387

[22] Filed: Feb. 19, 1992

Related U.S. Application Data

[62] Division of Ser. No. 643,189, Jan. 18, 1991.

[30] Foreign Application Priority Data

Jan. 22, 1990 [JP] Japan ................................. 2-4405
Feb. 7, 1990 [JP] Japan ................................. 2-11321
Oct. 26, 1990 [JP] Japan ................................. 2-290230

[51] Int. Cl.$^5$ ............................................. G11B 15/22
[52] U.S. Cl. ........................... 360/71; 360/74.1; 360/74.4; 360/137
[58] Field of Search ............... 360/71, 72.1, 74.1, 360/74.4, 137

[56] References Cited

U.S. PATENT DOCUMENTS 3,846,831 11/1974 Johnson, Jr. et al. ............. 360/74.4

OTHER PUBLICATIONS

Radio Shack 1989 Catalog, No. 432, ©1988, p. 44, PA Musical Powerhorn.

Primary Examiner—Joseph L. Dixon
Assistant Examiner—David L. Robertson
Attorney, Agent, or Firm—Blum Kaplan

[57] ABSTRACT

A portable audio apparatus allows a user to sing along with the recorded song, the user's voice and recorded song being outputted through a speaker. The apparatus permits the recorded lyrics or recorded tune of the song to be substantially eliminated prior to being reproduced by the speaker. The apparatus can operate in a fast forward or reverse mode and will stop between adjacent songs. A power savings circuit interrupts the supply of power to a motor to stop the latter from continuing to operate on a fast forward or reverse mode.

26 Claims, 12 Drawing Sheets

PORTABLE AUDIO APPARATUS HAVING A POWER SAVINGS DEVICE

This application is a division of application Ser. No. 07/643,189, filed Jan. 18, 1991 entitled PORTABLE AUDIO APPARATUS, currently pending.

BACKGROUND OF THE INVENTION

The present invention relates generally to a portable audio apparatus, and in particular, to a portable audio apparatus for use with singing accompaniment which allows a user to sing along as a recorded song is played with the user's voice and song outputted in unison through a speaker of the apparatus. A control device of the apparatus permits the volume of the recorded vocal track to be varied including in a predetermined combination with the recorded musical tune. A power control device of the apparatus reduces energy consumption and enhances the portability of the apparatus.

A conventional singing accompaniment system (i.e. empty orchestral music or music accompaniment systems) includes a reproducing device for reproducing a song (e.g. lyrics and tune) stored on a recording medium such as magnetic tape, an optical disc or the like. A microphone inputs the vocal sounds of singing person. A mixing and amplifying device combines a signal representing the song provided by the reproducing device with a signal representing the vocal sound from the microphone and then amplifies the combined signal. A speaker converts the amplified combined signal into sound waves.

Typically, the reproducing device and the mixing and amplifying device are integrally incorporated within a single housing unit. The microphone and speaker, however, are separate from the housing unit and are independent devices. Care must also be taken to sufficiently separate the microphone from the speaker to prevent howling by the latter caused by feedback therebetween.

Users of singing accompaniment systems prefer that the apparatus be portable. A conventional apparatus, however, requires a large installation space and is difficult to move. A conventional apparatus is bulky and weighs more than several kilograms. In fact, it is generally too large for an adult to move alone. A stationary audio is also rarely used apparatus. A stationary audio apparatus must also be near an electrical outlet further limiting its use as well as requiring the problems associated with electrical cords and the like.

Often song books are used while singing into the microphone of the apparatus. In this manner, when a person does not remember the lyrics of a song, he or she refers to one of the song books to continue singing. However, with a portable apparatus, a song book is not always readily available. A person who forgets the lyrics of a song and who cannot read from a song book will therefore stop singing.

Accordingly, it is desirable to construct a portable, audio reproducing apparatus which can select several tunes successively and provide a high quality reproduction of the same. The microphone should be a miniature, lightweight, wireless portable type which can easily adapt to the singing pose of a person. The apparatus would be miniaturized and lightweight, formed as a unitary structure with the microphone and speaker sufficiently separated from each other to prevent howling (feedback).

It is also desirable that the apparatus simultaneously control the vocal sound of the person singing and the reproduced recorded tune and be powered by a battery or the like to reduce power consumption. The apparatus should also assist the person singing who may not remember the lyrics to a song without resort to a songbook.

SUMMARY OF THE INVENTION

Generally speaking, in accordance with the invention, a portable audio apparatus permits a user to sing along as a recorded song is played with the user's voice and song outputted in unison through a speaker. A sound reproducing device produces a recorded vocal signal based on the recorded lyrics and a recorded musical tune signal based on the recorded tune. A synthesizing device combines the recorded vocal signal with the recorded musical tune signal and produces an output signal in response thereto representing the combination of the two signals. An adjusting device is operable for varying the combination of the recorded vocal signal and the recorded musical tune signal represented by the output signal. A control device can set the adjusting device to a predetermined combination of the recorded vocal signal with the recorded musical tune signals. This predetermined combination can be outputted through the speaker so that a user who has forgotten the lyrics to the song can be assisted by listening to the recorded lyrics.

A microphone produces a vocal signal representing the user's voice. The synthesizing device adds this vocal signal to the output signal. The adjusting device includes an attenuating element for changing the magnitude of the recorded vocal signal and musical tune signal prior to combining the two signals to form the outputted signal.

In accordance with another aspect of the invention, a power saving device is included in the portable audio apparatus. A motor is provided for moving the recording medium in at least forward, fast forward and rearward modes. A sound reproducing device is provided for reproducing the recorded vocal sound signals and the recorded musical tune signals stored on the recording medium. A detecting device determines when the combined recorded vocal signal and musical tune signal are below a predetermined level and produces an output signal based thereon. An additional control device controls the supply of power to the motor in response to the output signal of the detecting device.

The power saving device further includes a start switching device for initiating operation of the detecting device based on the motor moving the recording medium in either the fast forward or rearward modes. A generating device responsive to the output signal produces an information signal. The speaker provides a message based on the information signal.

The start switching device of the apparatus has a fast forward switch operable for being maintained in locked and unlocked positions and for initiating the motor to move the recording medium in the fast forward mode when in its locked position. The start switching device also includes a rearward switch operable for being maintained in the locked and unlocked positions and for initiating the motor to move the recording medium in the rearward mode when in its locked position. An AND circuit with a first leaf switch and a second leaf switch respectively control the operation of the detecting device based on the recording medium moving in the fast forward and rearward modes.

Accordingly, it is an object of the invention to provide an improved portable audio apparatus which is miniature and lightweight.

It is another object of the invention to provide an improved portable audio apparatus which has a power consumption requirements.

It is a further object of the invention to provide an improved portable audio apparatus having a singing accompaniment function which assists a person singing who forgets the lyrics to the song.

It is still another object of the invention to provide an improved portable audio apparatus which prevents howling.

It is still a further object of the invention to provide an improved portable audio apparatus which can easily and simply vary the volume of the recorded lyrics which are reproduced by the speaker of the apparatus.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1A:
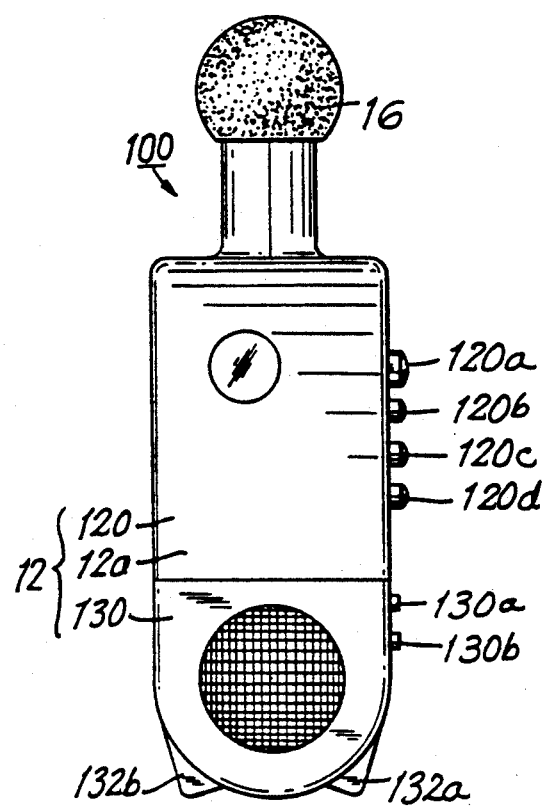
FIG. 1(a) is a front elevational view of a portable audio apparatus constructed in accordance with a first embodiment of the invention.
Figure 1B:
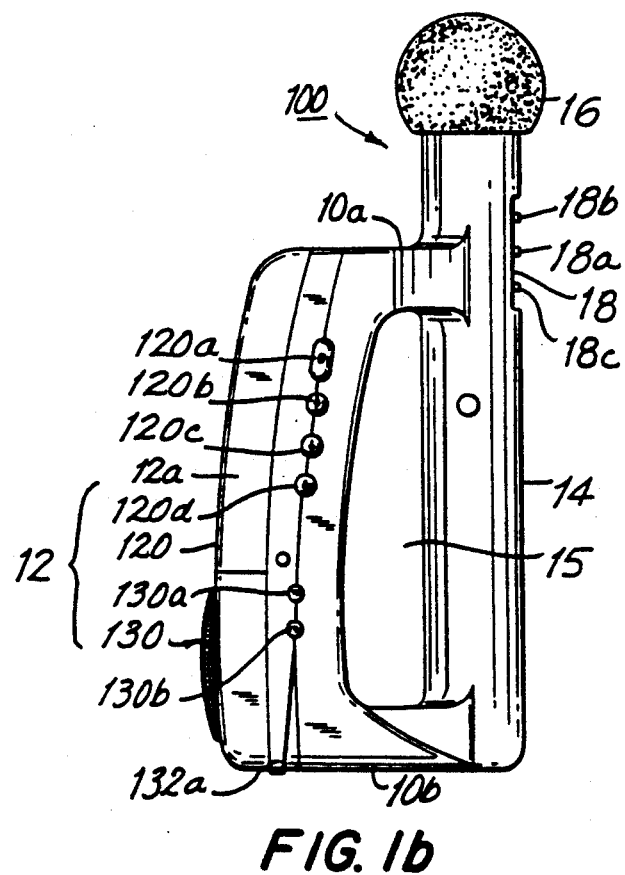
FIG. 1(b) is a right elevational view of FIG. 1(a)
Figure 1C:
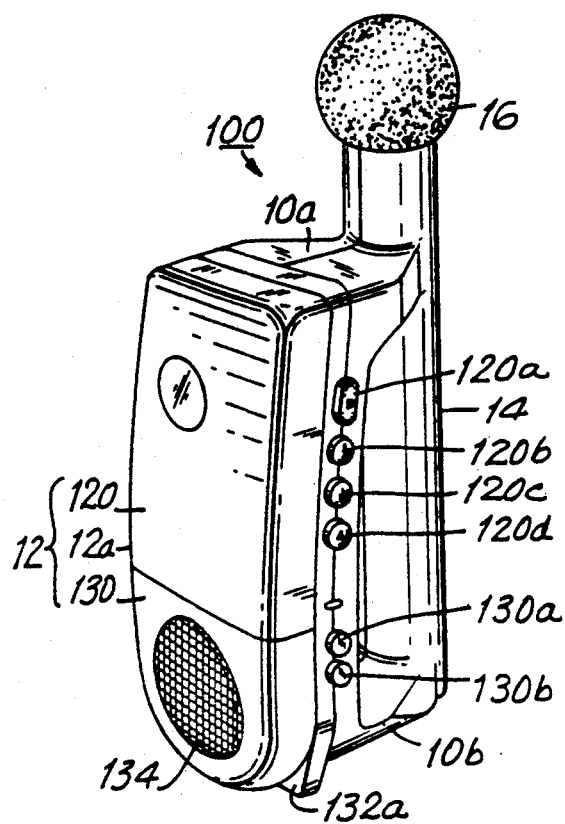
FIG. 1(c) is a perspective view of FIG. 1(a)
Figure 1D:
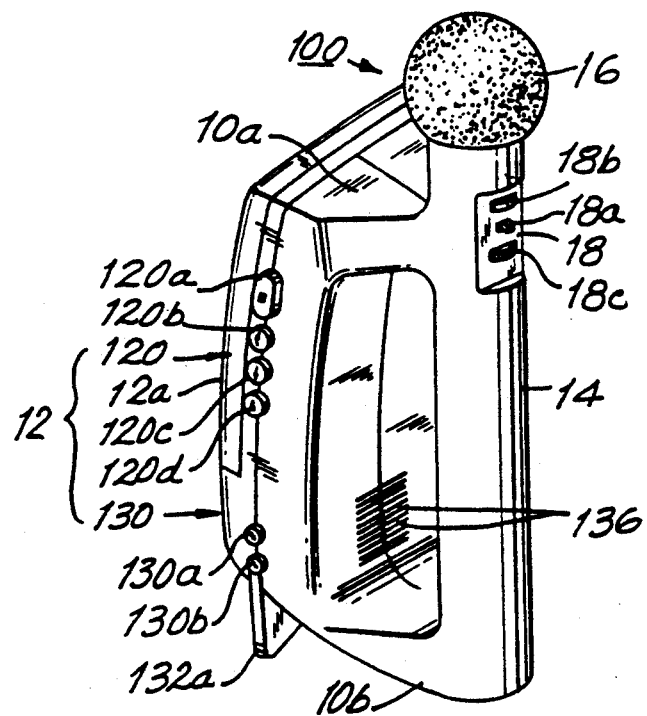
FIG. 1(d) is another perspective view of FIG. 1(a)

Reference is first made to FIGS. 1(a), 1(b), 1(c) and 1(d) of the drawings which depict a portable audio apparatus, generally indicated at 100 and constructed in accordance with a first preferred embodiment of the invention. Portable audio apparatus 100 has a compact size. The maximum external dimensions are as follows: overall height of 283 mm including projections, a width of 97 mm and a depth of 28 mm. The maximum weight is 640 g including a dry battery.

Apparatus 100 is provided with an apparatus body section 12, a gripping portion 14 and a microphone section 16. Further, apparatus body section 12 includes a vocal sound medium storage section 120, a substantially rectangular parallelopiped body casing 12a for storage of an audio cassette and a speaker storage section 130. Speaker storage section 130 is positioned below vocal sound medium storage section 120. A tape deck, compact disc or the like for reproducing vocal sounds is stored on the rear side of vocal sound medium storage section 120 as discussed below. Although other storage devices such as a compact disc can be used, for exemplary purposes, the recording medium discussed hereinafter will be a magnetic type.

Push button tops 120a, 120b, 120c and 120d of push button switches and volume knobs 130a and 130b are provided on the casing side surface of vocal sound storage section 120 and project therethrough. Push button tops 120a, 120b, 120c and 120d and knobs 130a and 130b are constructed with different colors to easily distinguish one from the other. Push button top 120a stops the feeding of a magnetic tape. Push button top 120b initiates fast-feeding of the magnetic tape. Push button top 120c initiates rewinding the magnetic tape and push button top 120d activates the reproduction of a vocal sound signal which has been recorded on the magnetic tape. Echoes produced by the microphone can be eliminated through adjustment of volume knob 130a. Volume balance between the user's voice picked up by the microphone and the song recorded on the tape and reproduced by apparatus 100 is adjusted by volume knob 130b.

Grip section 14 and microphone section 16 are integrally connected to each other to form a substantially cylindrical body. Leg parts 132a and 132b project from the left and right sides of the bottom surface of apparatus body 12. A control panel 18 is provided on the side surface of the cylindrical casing between grip section 14 and microphone section 16. Control panel 18 is provided with a side switch knob 18a and volume dials 18b and 18c positioned respectively above and below knob 18a. Knob 18a changes the operation mode of apparatus 100 from singing accompaniment (i.e. empty orchestral music or music accompaniment) to a loudspeaker for microphone 16. When operating a sound multiplex tape, volume dial 18b adjusts the volume balance between the recorded lyrics and the recorded musical tune. Volume dial 18c adjusts the sound volume of microphone sound volume. Cylindrical grip section 14 is integrally coupled to apparatus body section 12 through upper coupling part 10a and lower coupling part 10b. An opening 15 is formed between grip section 14 and apparatus body section 12 for the user to insert his or her hand therethrough in holding apparatus 100.

Reference is now made to FIGS. 2(a), 2(b), 2(c), 2(d), 2(e) and 2(f) of the drawings which depict a portable audio apparatus, generally indicated at 200 and constructed in accordance with an alternative embodiment of the invention. Portable audio apparatus 200 also has a compact size. Similar to apparatus 100, the maximum external dimensions of apparatus 200 are as follows: a height of 300 mm, a width of 100 mm and a depth of 121 mm. The total weight of apparatus 200 is 700 g, including dry batteries. Apparatus 200 includes an apparatus body 22, a grip section 24 and a microphone section 26. Apparatus body section 22 includes a vocal sound medium storage section 220, a substantially rectangular parallelopiped body casing 221 for storage of an audiocassette or other suitable recording medium and a speaker storage section 230.

Push button tops 220a, 220b, 220c, 220d and 220e of push button switches and volume rotary discs 230a and 230b are provided on the casing side surface of vocal sound storage section 220 and project therethrough. Push button tops 220a, 220b, 220c, 220d and 220e and rotary discs 230a and 230b are constructed with different colors to enable the user to easily distinguish one from the other. Push button top 220a stops the feeding of a magnetic tape. Push button top 220b initiates feeding of the magnetic tape. Push button top 220c initiates rewinding of the magnetic tape. Push button 220d initiates playing of the reproduced vocal sound signal which is recorded on the magnetic tape. Push button top 220e initiates the play mode (i.e. reproducing mode) after completion of an intro-scan of a selected tune (i.e., scanning to determine the beginning or end of a song) and therefore acts as a start/stop push button. Further, volume rotary disc 230a adjusts for echoes created by use of the microphone. Volume rotary disc 230b adjusts the volume balance between the microphone and tape.

Each volume rotary disc 230a and 230b has an exposed surface with an area greater than that of a finger of an adult person. Volume rotary discs 230a and 230b are formed with a semispherical projection m and semispherical recess n. Knobs 130a and 130b of apparatus 100 are rotated and manipulated while holding the knobs between the thumb and the forefinger. On the other hand, rotary discs 230a and 230b of apparatus 200 can be easily rotated by any one of the five fingers of a user. Therefore, rotary discs 230a and 230b improve the manipulatability of the controls.

A volume rotary disc 230c is provided on the other casing side surface and is also formed with a semispherical projection m and semispherical recess n. In addition, rotary disc 230c adjusts the volume balance between the recorded lyrics and musical tune of a recorded song when using a sound multiplex tape. Push button top 230d, positioned below rotary disc 230c, decreases the volume of the recorded lyrics, while initiates muting of the recorded lyrics and simultaneously increases the volume of the recorded music tune. This button is applicable for non-multiplex tapes. An input jack 230e is provided for an AC adapter during use of an external power source.

Grip section 24 and microphone section 26 are integrally connected with each other to form a substantially cylindrical body. Further, resilient leg parts 232a and 232b are projected from the left and right sides of the lower part of speaker storage section 230 and a resilient leg part 232c is projected from the bottom part of grip section 24. A control panel 28 is provided on the side surface of the cylindrical casing between grip section 24 and microphone section 26. Control panel 28 is provided with a push button top 28b for a vocal sound assist switch for issuing a vocal sound only when it is continuously pushed for a long period of time. Cylindrical grip section 24 is integrally coupled to apparatus body section 22 by means of upper and lower coupling parts 20a and 20b. A through space 15 is formed between grip section 24 and apparatus body section 22 creates a grip for the user to insert his or her hand.

Figure 2A:
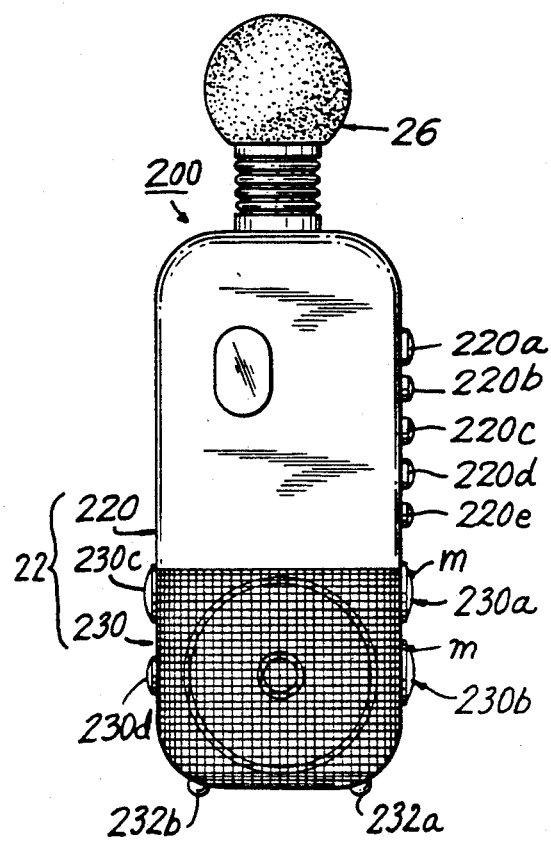
FIG. 2(a) is a front elevational view of a portable audio apparatus constructed in accordance with another embodiment of the invention.
Figure 2B:
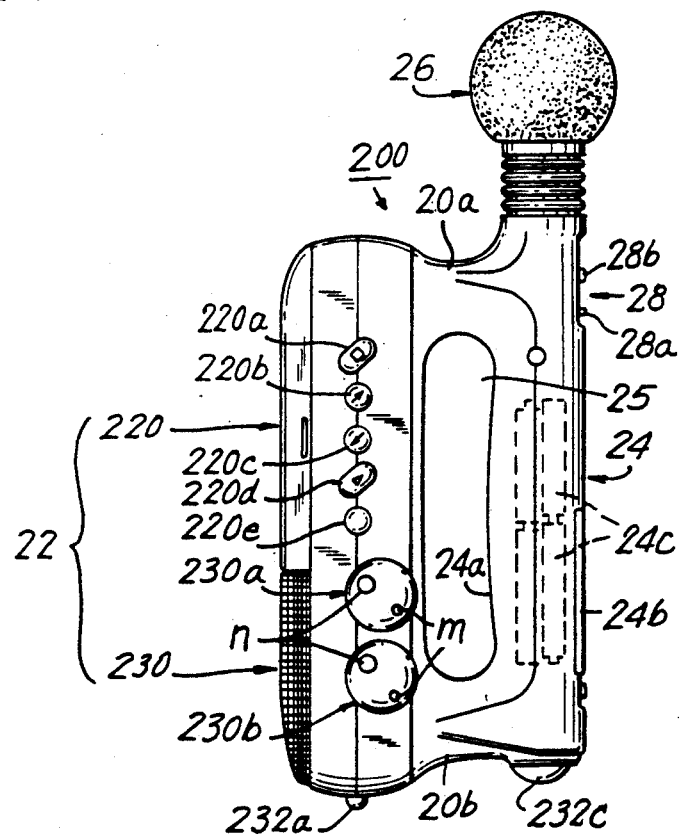
FIG. 2(b) is a right side elevational view of FIG. 2(a)

Apparatus 200, as in apparatus 100, is provided with a resin body casing 22a, a resin right half 24a and a resin left half 24b. To assembly apparatus 200, right half 24a and left half 24b are connected together by a screw $S_1$. Body casing 22a is coupled to the unit formed by right half 24a and left half 24b by screws $S_2$, $S_3$, $S_4$ and $S_5$. An opening and closing cover 244 is laterally operable. When cover 244 is closed, a tape cassette storage chamber 246 forms a complete air-tight condition. A speaker (not shown), similar to that set forth in apparatus 100, is disposed in speaker storage section 230 in body casing 22a. The front surface of the speaker is covered with a mesh-like speaker cover 234. At the same time, cap 248 is constructed with a capacitor microphone inserted in the upper end of the cylindrical body. The top of right half 24a, the top of left half 24b and cap 248 are coupled together and are then covered with a sponge windshield 250. As shown in FIG. 2(b), grip section 24 is not formed with a cylindrical shape having a uniform diameter, but has a bulged part 24a which fits in the palm of a hand of a user. In this manner, apparatus 200 can be easily held. A battery cover 24b is attached to the outer surface of grip section 24 and batteries 24c are disposed inside grip section 24.

Figure 3:
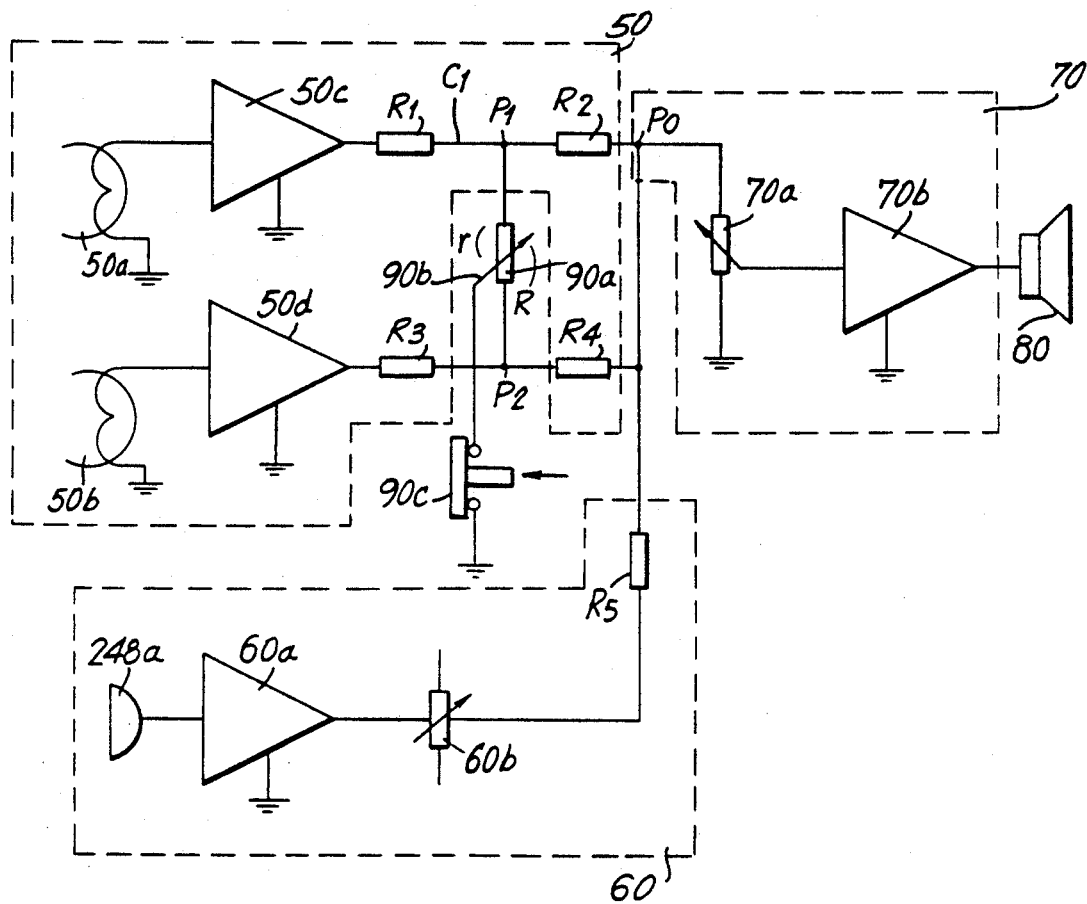
FIG. 3 is a circuit block diagram of the portable audio apparatus in accordance with the invention.

FIG. 3 is a circuit block diagram of portable audio apparatus 200 constructed in accordance with the invention. Either a sound multiplex tape cassette or other more conventional types of tape cassette (i.e. a tape cassette with recorded vocal sound) may be used. In addition, a tape cassette for use with singing accompaniment wherein only music tunes are recorded, may also be used. The circuit arrangement of apparatus 200 using for exemplary purposes only a sound multiplex tape cassette will now be described.

Similar to typical singing accompaniment systems, apparatus 200 is composed of vocal sound reproducing system 50, vocal sound input system 60, mixing and amplifying system 70 and speaker 80 as a transducer. Vocal sound reproducing system 50 includes a vocal sound reproducing magnetic head 50a and music tune reproducing magnetic head 50b which are attached to the tape deck located in deck storage chamber 30. A reproduced weak sound signal is amplified by a preamplifier 50c and then supplied to a mixing and amplifying system 70 through a pair of resistors $R_1$ and $R_2$. Further, a reproduced musical tune signal is amplified by preamplifier 50d and then supplied to mixing and amplifying system 70 through a pair of resistors $R_3$ and $R_4$.

A vocal sound input system 60 includes capacitor microphone 248a, a preamplifier 60a for amplifying the weak input vocal sound signal, a volume adjusting element 60b and a resistor $R_5$. The amplified signal is then supplied to mixing and amplifying system 70 through volume adjusting element 60b and resistor $R_5$. Mixing and amplifying system 70 includes a combined sound volume adjusting element 70a coupled to volume adjusting dial 28a of FIG. 2(e) and power amplifier 70b as a driver for small size speaker 80.

Figure 2C:
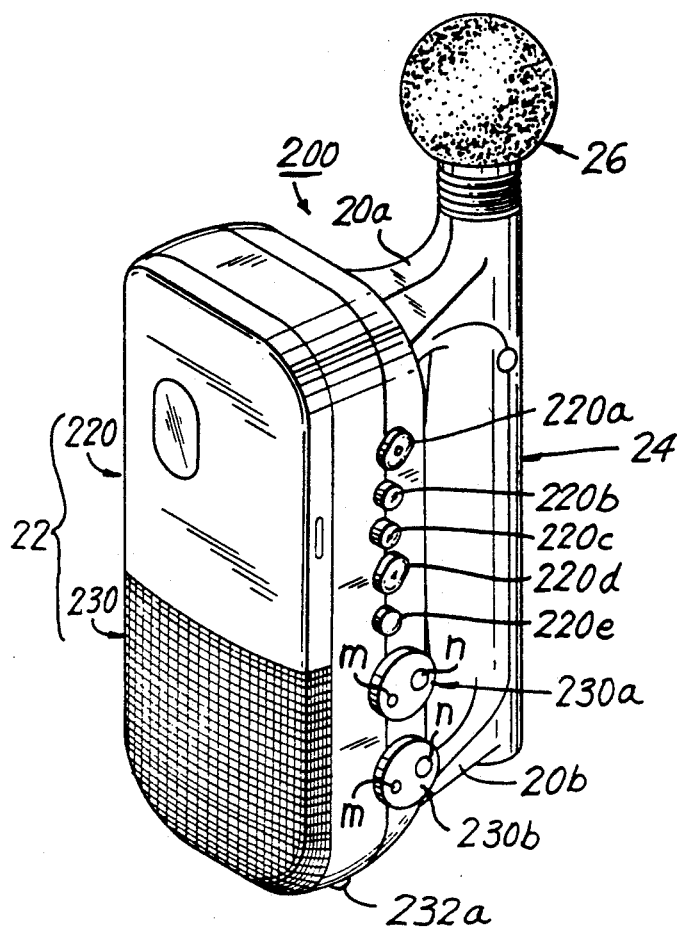
FIG. 2(c) is a perspective view of FIG. 2(a)
Figure 2D:
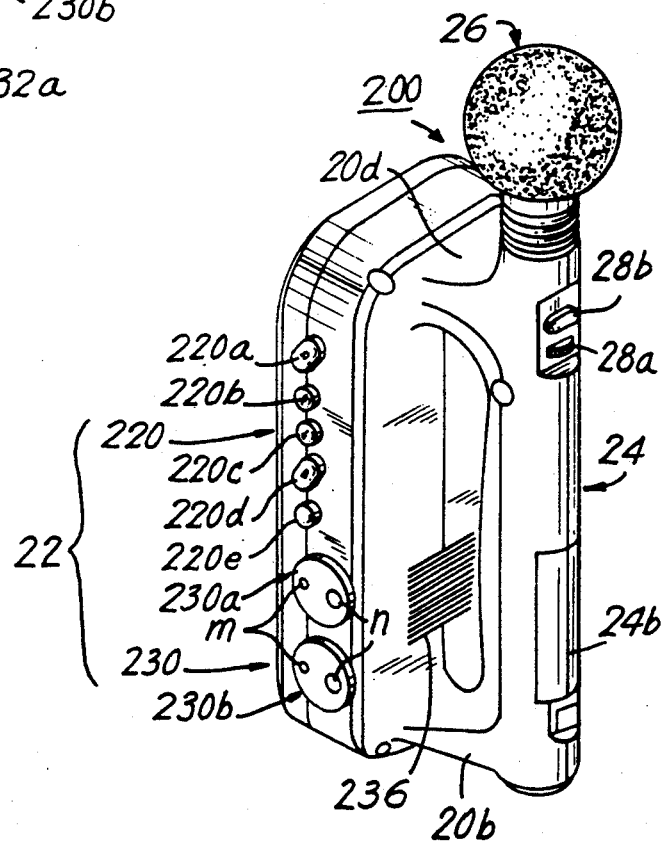
FIG. 2(d) is another perspective view of FIG. 2(a)
Figure 2E:
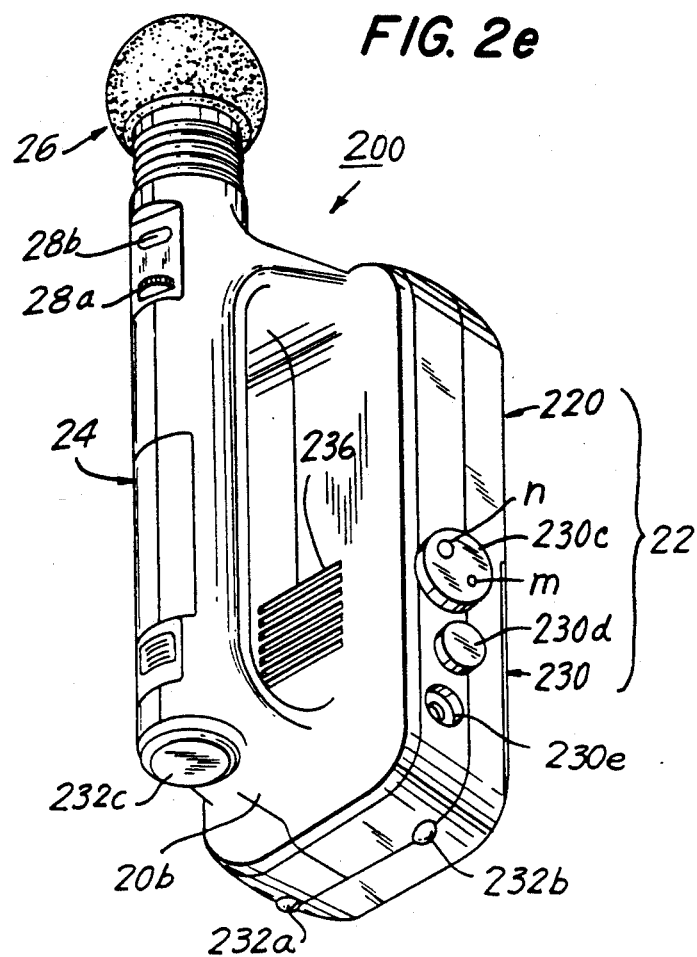
FIG. 2(e) is still another perspective view of FIG. 2(a)
Figure 2F:
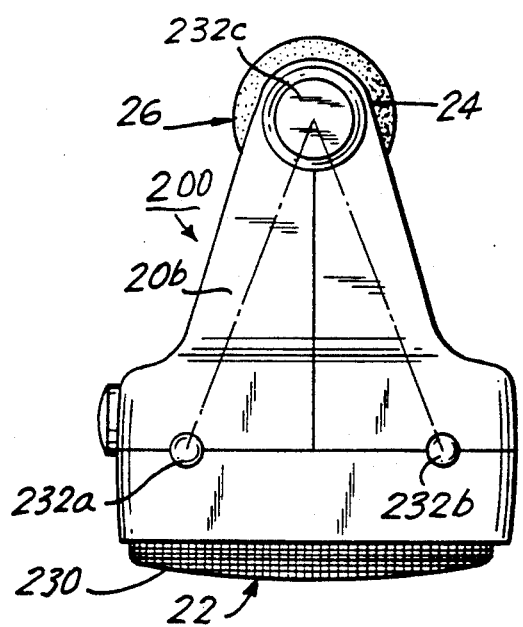
FIG. 2(f) is a bottom plan view of FIG. 2(a)

After the sound multiplex tape cassette is loaded in tape cassette storage chamber 246, the user activates the play mode (i.e. reproducing mode) by pressing push button top 220d as shown in FIG. 2(c). The tape runs in the play mode. A reproduced vocal sound signal and the reproduced music tune signal are mixed together at a connecting point $P_0$ between resistors $R_2$ and $R_4$. Accordingly, the reproduced sound (i.e. the recorded vocal sound and the recorded musical tune sound) from the sound multiplex tape is outputted from speaker 80. When a person sings into microphone section 26, his voice is inputted through microphone 248a, amplified and then outputted from speaker 80, simultaneously with the reproduced sound.

A sound multiplex volume balance device 90a is disposed between connecting point $P_1$ of resistors $R_1$ and $R_2$, connecting point $P_2$ of resistors $R_3$ and $R_4$, and a normally closed push switch 90c. Closed push switch 90c is disposed between sliding element 90b of volume balance device 90a and a reference voltage level such as ground. Sound multiplex volume balance device 90a has a resistance R between points $P_1$ and $P_2$ and a resistance r between connecting point $P_1$ and sliding element 90b. A reproduced vocal sound signal $C_1$ is outputted by resistor $R_1$. Signal $C_1$ then splits traveling through resistor $R_2$ into mixing and amplifying system 70 and through volume balance device 90a, sliding element 90b and push switch 90c to ground. In traveling (leaking) to ground though volume balance device 90a, signal $C_1$ is attenuated through the resistance r. A reproduced musical tune signal $C_2$ which is outputted by resistor $R_3$. Signal $C_2$ then splits traveling though resistor $R_4$ into mixing and amplifying system 70 and through volume balance device 90a, sliding element 90b and push switch 90c to ground. In traveling (leaking) to ground through volume device 90a, signal $C_2$ is attenuated through the resistance value of R-r. Accordingly, the balance between the reproduced vocal sound signal and the reproduced musical tune signal is adjusted based upon the position of sliding element 90b. If r>R-r, the music tune sound is greater than the vocal sound, or vice versa.

If the user prefers not to listen to the recorded lyrics to a song, the vocal sound (i.e. vocal sound from a professional singer through magnetic head 50a) is restricted while the musical tune sound is increased (i.e., $r<<(R-r)$). Alternatively, if the recorded lyrics substantially without the recorded lyrics is desired, balance volume device 90a is adjusted so that $r>>(R-r)$.

A user may also wish to listen to the song with neither the lyrics nor musical tune attenuated by balance volume device 90a. This listening mode is achieved by depressing push button top 28b which is linked to push switch 90c so that push switch 90c is opened. Sliding element 90b is no longer connected to ground. Therefore, attenuation of reproduced vocal sound signal $C_1$ and reproduced music tune signal $C_2$ is interrupted. The combination of signal $C_1$ and $C_2$ is now based, in part on the predetermined resistive relationship between the scan of resistors $R_1+R_2$ and resistors $R_3+R_4$. In this manner, not only the musical tune sound, but also the vocal sound are outputted from speaker 80. A person singing who forgets the lyrics of a song by depressing push button top 28b (i.e., the vocal sound assist switch) receives vocal assistance from the recorded lyrics by a professional singer which is outputted from speaker 80. Therefore, by depressing push button top 28b, the volume of the recorded lyrics is reset to a predetermined level which corresponds to the volume of the musical tune. In other words, the decreased volume of the recorded vocal sound is reset to a normal operating volume so that a person singing can continue singing while following the recorded lyrics.

Figure 4:
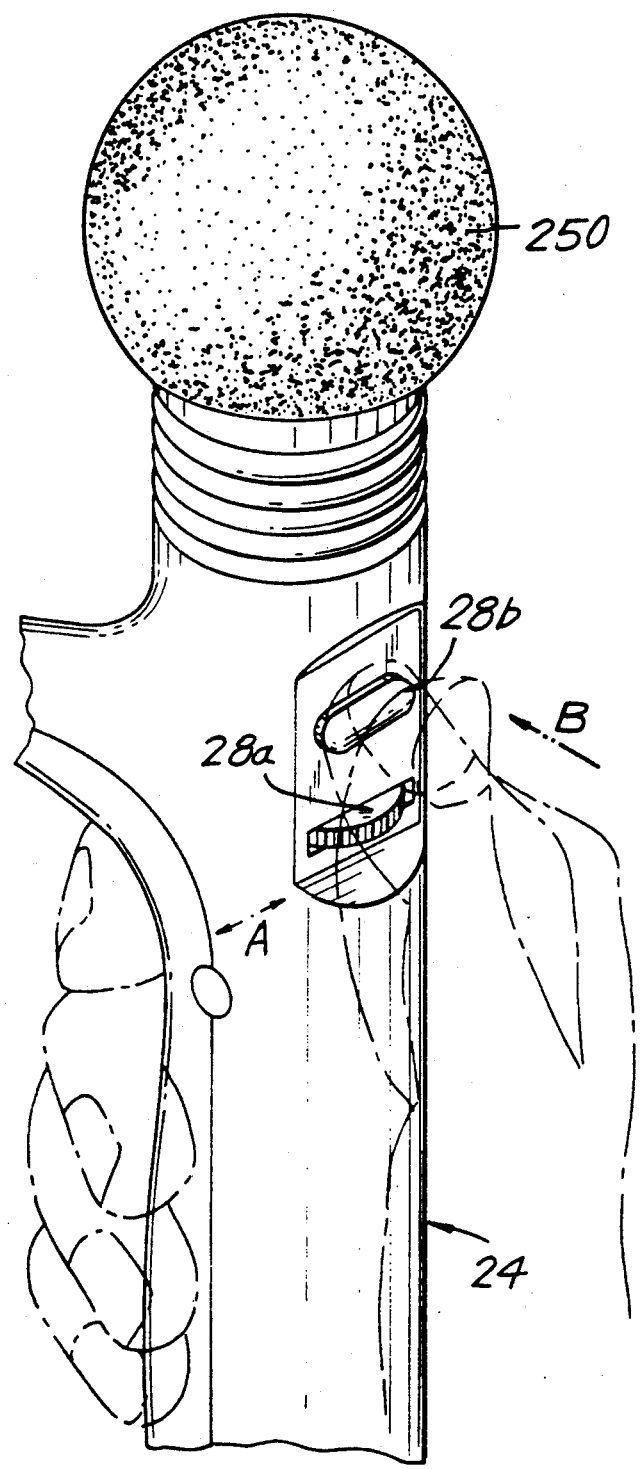
FIG. 4 is a partial perspective view illustrating thumb manipulation of the adjusting knobs of FIG. 2(d)

Reference is now made to FIG. 4 wherein push button top 28b for the vocal sound assist switch or the volume adjusting dial 28a is shown being manipulated by the user's thumb while holding grip section 24 by one hand. Volume adjusting dial 28a is located closer to grip section 24 than push button top 28b for vocal sound assist switch 28c. A manipulative force to volume adjusting dial 28a is in a direction indicated by the one-dot chain line arrow A shown in FIG. 20. A manipulation force to push button top 28b for the vocal sound assist switch 28a is in the direction indicated by the two-dot chain line arrow B also shown in FIG. 4. When volume adjusting dial 28a is turned, the flank of the thumb, indicated by the one-dot chain line, is brought into contact with dial 28a, while moving the thumb in the direction of the one-dot chain line arrow A. In this manner, the tip of the thumb can barely touch push button top 28b. Accordingly, there is no possibility of unexpectedly pressing push button top 28b since volume adjusting dial 28a serves as a fulcrum and the top of the thumb is naturally set apart from push bottom top 28b.

At the same time, when push button top 28b is manipulated by the pressure exerted by the thumb, the flank of the thumb makes contact with volume adjusting dial 28a. With this motion, the tip of the thumb moves in the direction of arrow B. Even though the flank of the thumb follows the direction of arrow B to press push button top 28b, dial 28a is not substantially turned. Since a pressing force in the direction of arrow B passes through the rotational center of dial 28a, there is only a minimum movement of dial 28a.

On the other hand, the positional relationship between volume adjusting dial 28a and push button top 28b for the vocal sound assist switch, as shown in FIG. 3, is such that if push button top 28b for the vocal sound assist switch is located closer to grip section 24 rather than volume adjusting dial 28, improved manipulatability is not achieved. In this configuration, there is also a small risk of pressing push button top 28b simultaneously with the turning of volume adjusting dial 28a. Further, the turning of volume adjusting dial 28a by the tip of the thumb is very difficult. In addition, when push button top 28b for vocal sound assist switch 90c is pressed, push button top 28b is difficult to press by the flank of the thumb. Push button top 28b must be pressed by the tip of the thumb. Accordingly, the user must press push button top 28b after the tip of the thumb is located at a position above volume adjusting dial 28a. Manipulatability is limited and can cause erroneous operation.

The relationship between volume adjusting dial 28a and push button top 28b is disclosed in FIG. 4 and requires no vertical shift of the tip of the thumb. Accordingly the audio apparatus can be manipulated quickly and easily resulting in superior configuration with low possibility of erroneous operation. Manipulation of the audio apparatus can be made in the dark, without visually confirming the positions of push button top 28b and volume adjusting dial 28a resulting in a superior design.

Figure 5:
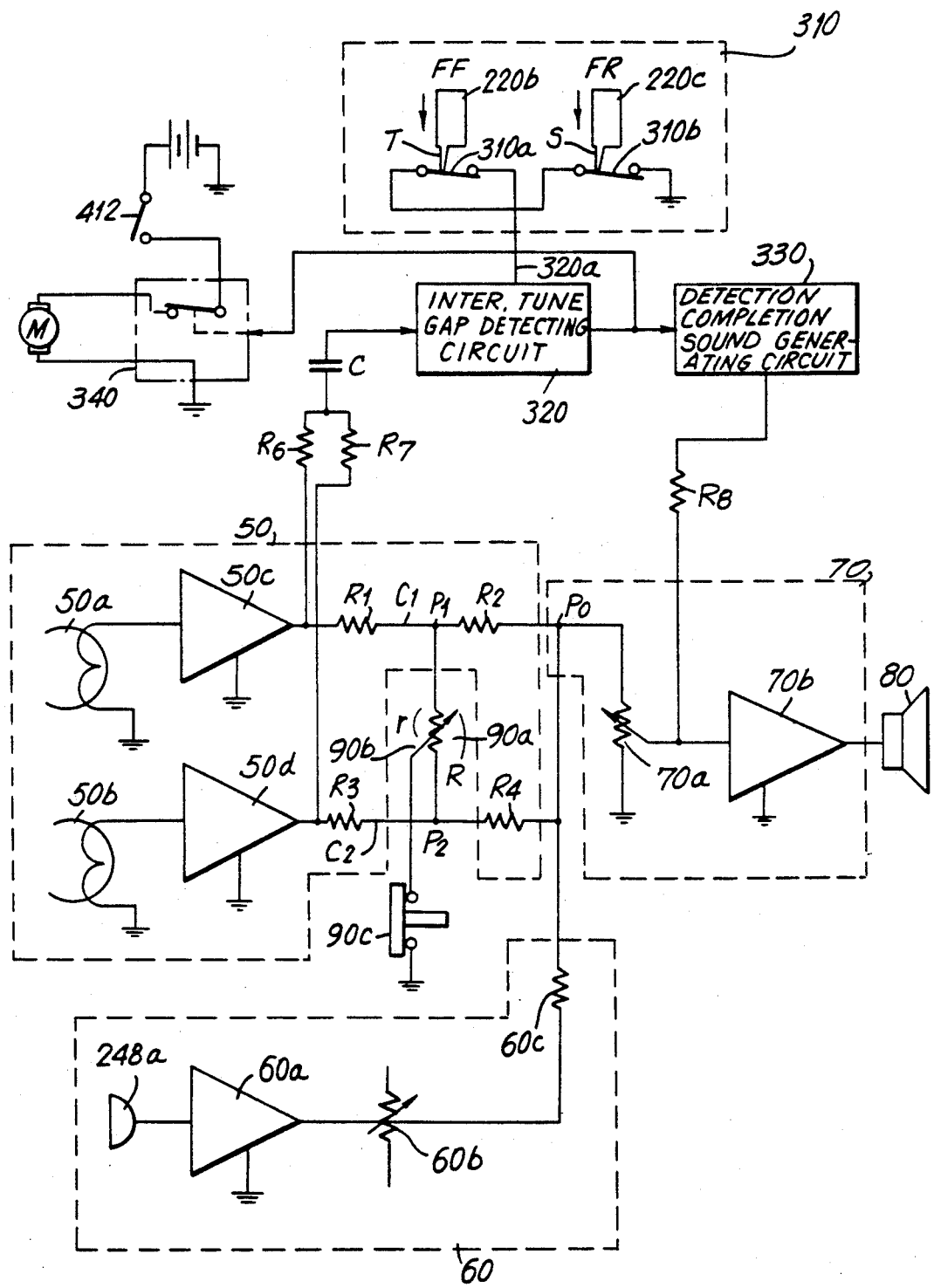
FIG. 5 is a circuit block diagram including the circuitry of FIG. 3 and for an automatic tune intro-scan operation starting device.

Reference is now made to FIG. 5 which discloses a circuit block diagram illustrating the basic circuit block of apparatus 200 shown in FIG. 3 and an electronic circuit system for an automatic tune intro-scan operation and starting device. Like reference numerals are used in FIG. 5 to denote those parts shown in FIG. 3 and the explanation thereof is abbreviated. The electronic circuit system for the automatic tune intro-scan operation and starting device includes an intro-scan operation starting circuit 310, an inter-tune gap detecting circuit 320, a detection completion sound generating circuit 330 and a motor stopping circuit 340. The intro-scan operating starting circuit 310 is provided with leaf switches 310a and 310b electrically connected in series. The series circuit of leaf switches 310 and 310b is connected between a state selecting terminal 320a of the inter-tune gap detecting circuit 320 and ground. Leaf switches 310a and 310b are in a closed position during normal operation. Accordingly, state selecting terminal 320a of inter-tune gap detecting circuit 320 is at ground potential (i.e. low potential).

In this state, inter-tune gap detecting circuit 320 is held in a deenergized condition (i.e. stationary state). Leaf switch 310a is opened by pressing fast-feed push button top 220b such that projection T makes contact with push button top 220b. At the same time, leaf switch 310b is opened by pressing rewinding push button top 220c such that projection S makes contact with push button top 220c. When either leaf switch 310a or 310b is opened, state selecting terminal 320a of inter-tune gap detecting circuit 320 is at a greater potential than the ground potential. Therefore, inter-tune gap detecting circuit 320 is turned ON (i.e. active state).

Inter-tune gap circuit 320 has an active-high circuit arrangement in which a reproduced amplified vocal sound signal from preamplifier 50c is inputted through a resistor $R_6$ and a capacitor C and a reproduced and amplified music tune signal from preamplifier 50d is inputted through a resistor $R_7$ and capacitor C. Therefore, inter-tune gap circuit 320 receives the combined recorded vocal sound signal and the recorded musical tune signal and detects a non-signal or a low level condition between adjacent songs. When the non-signal or low level condition is detected by inter-tune gap detecting circuit 320, a trigger signal is outputted to motor stopping circuit 340 and detection completion sound generating circuit 330.

Motor stopping circuit 340 stops the rotation of an electronic governor motor M for driving a reel in tape cassette 260 by applying the trigger inter-tune gap detection) signal from inter-tune gap detecting circuit 320. At the same time, detection completion sound generating circuit 330 supplies an information signal or an artificial vocal sound signal to power amplifying device 70a through a resistor $R_8$ in response to receiving the trigger signal.

Figure 6:
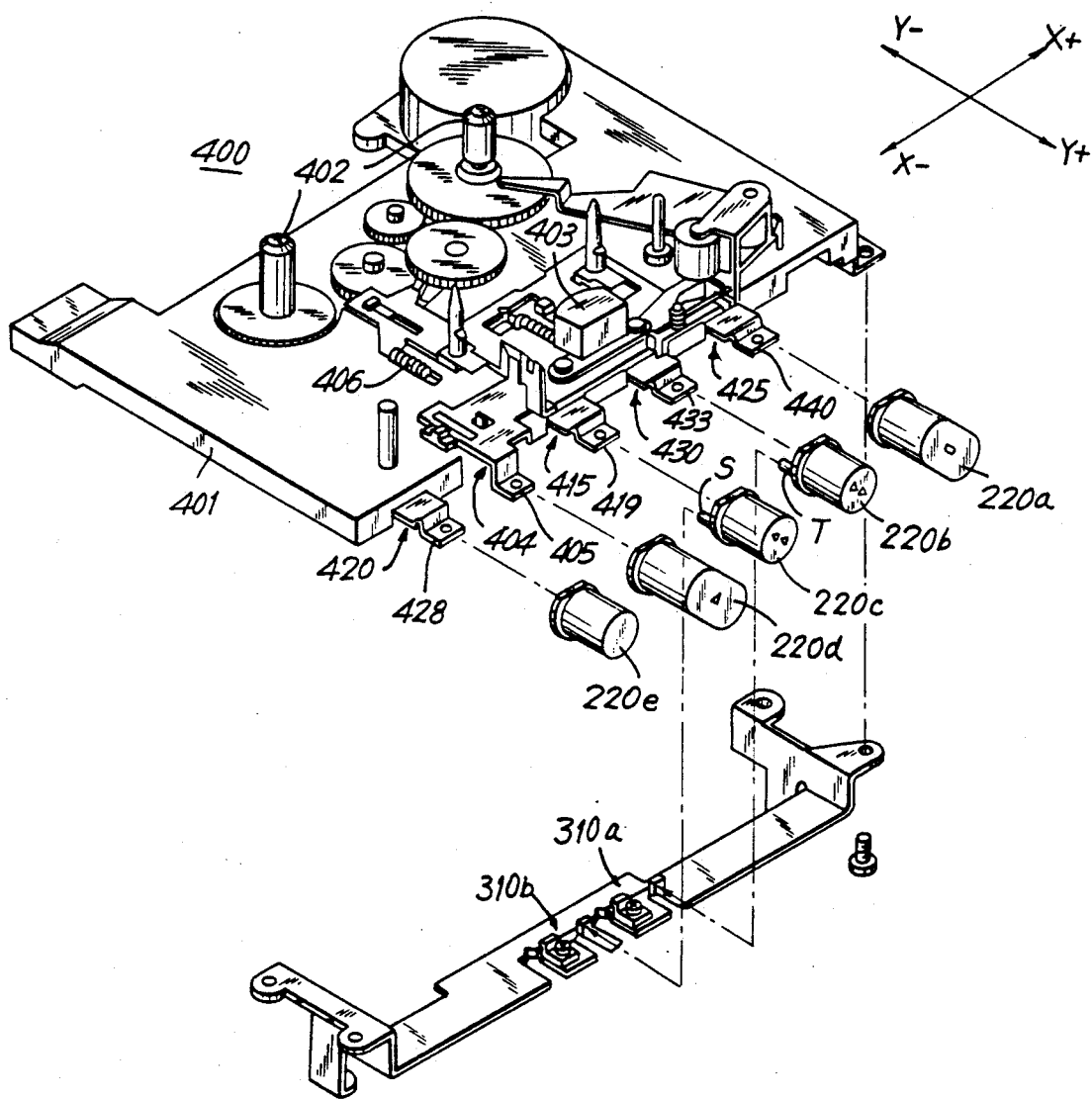
FIG. 6 is an exploded perspective view of the tape deck of FIG. 2(a)

Reference should now be had to FIG. 6 which illustrates a mechanism relating to the circuit system of automatic intro-scan operation starting device 310, and FIGS. 7(a), 7(b), 7(c), 7(d), and 7(e) which depict the mechanism system in various operating states. A tape deck 400 is provided with components assembled to a front and a rear surface of a resin base board 401. Reel shafts 402 are projected from the rear surface of resin base board 401 and are inserted in reel holes of tape cassette 260 when the latter is loaded. A play lever 404 is provided with head assembly 403. Head assembly 403, including reproducing magnetic head 50a and music tune reproducing magnetic head 50b of FIG. 3, is slidably installed on resin base board 401 in direction $Y_+$ and $Y_-$. Play lever 404 has an engaging piece 405 onto which play (i.e. reproducing) push button top 220d is fitted. A coil spring 406 is stretched between play lever 404 and resin base board 401. The resiliency of coil spring 406 exerts a return force in the direction of arrow $Y_+$ to play lever 404.

Figure 7A:
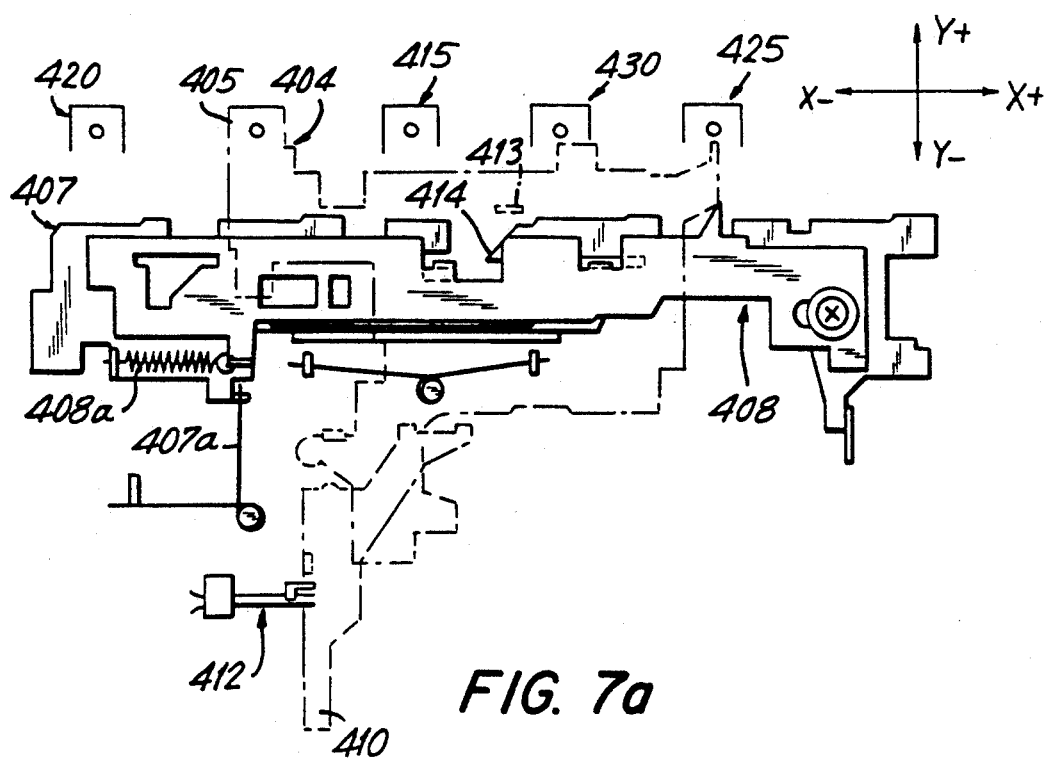
FIGS. 7(a), 7(b), 7(c), 7(d), 7(e) and 7(f) are plan views of the mechanism of FIG. 6.

As shown in FIG. 7(a), a lower slide plate 407 and an upper slide plate 408 are attached to the rear surface of resin base board 401. Lower slide plate 407 is slidably adaptable in the directions of a pair of arrows $X_+$ and $X_-$. The resiliency of a torsion spring 407a exerts a return force in the direction of the arrow $X_-$ to lower slide plate 407. Upper slide plate 408 can be slidably directed on lower slide play 407 in the directions of arrows $X_+$ and $X_-$. The resiliency of coil spring 408a exert a return force in the direction of arrow $X_-$ to upper slide plate 408.

Figure 7B:
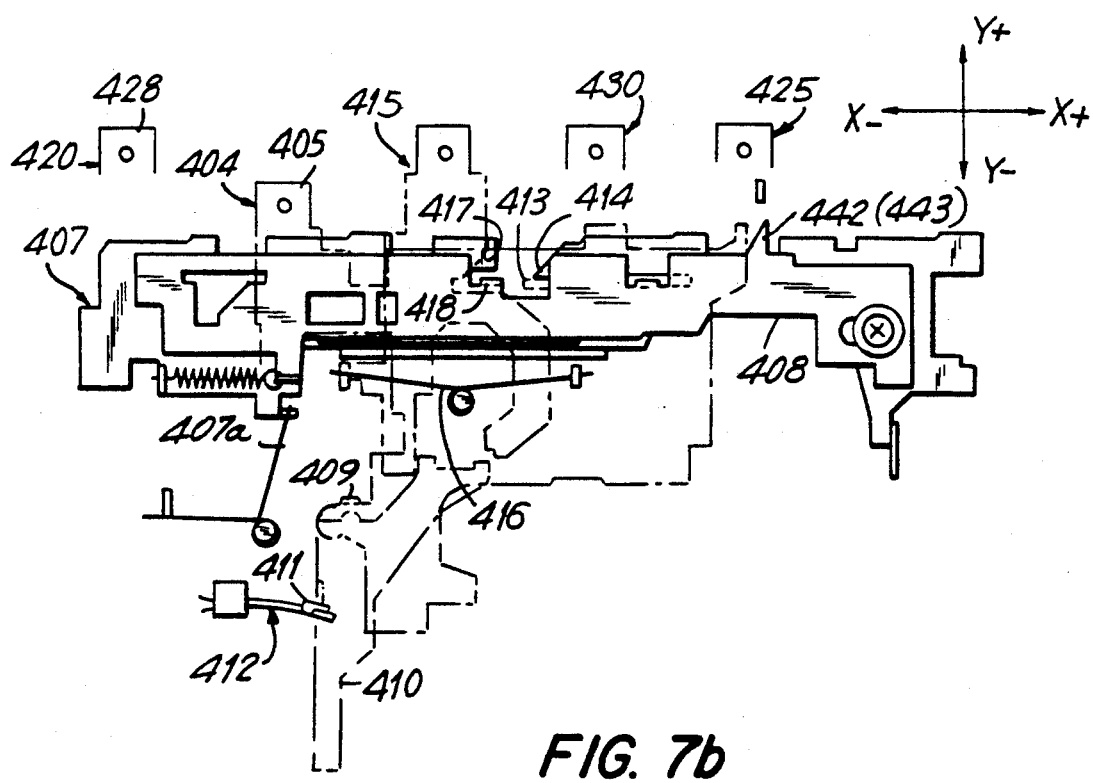

When play lever 404, indicated by the one-dot chain line in FIG. 7(b), is pressed in the direction of arrow $Y_-$, projection 409 pushes a slide plate 410, indicated by the two-dot chain line in FIG. 7(b), in the direction of arrow $Y_-$. This in turn causes projection 411 on slide plate 410 to close leaf switch 412. The closing of leaf switch 412 (which serves as a power switch) permits a power source voltage to be supplied to motor M and the accompanying circuit. Simultaneously, another projection 413 on play lever 404 presses an inclined surface of pawl part 414 of slide plate 407 to move lower slide plate 407 in the direction of arrow $X_+$. The exerted force overcomes the spring force of torsion spring 407a while being accompanied by upper slide plate 408. Accordingly, projection 413 is engaged with pawl part 414 to lock play lever 404.

Figure 7C:
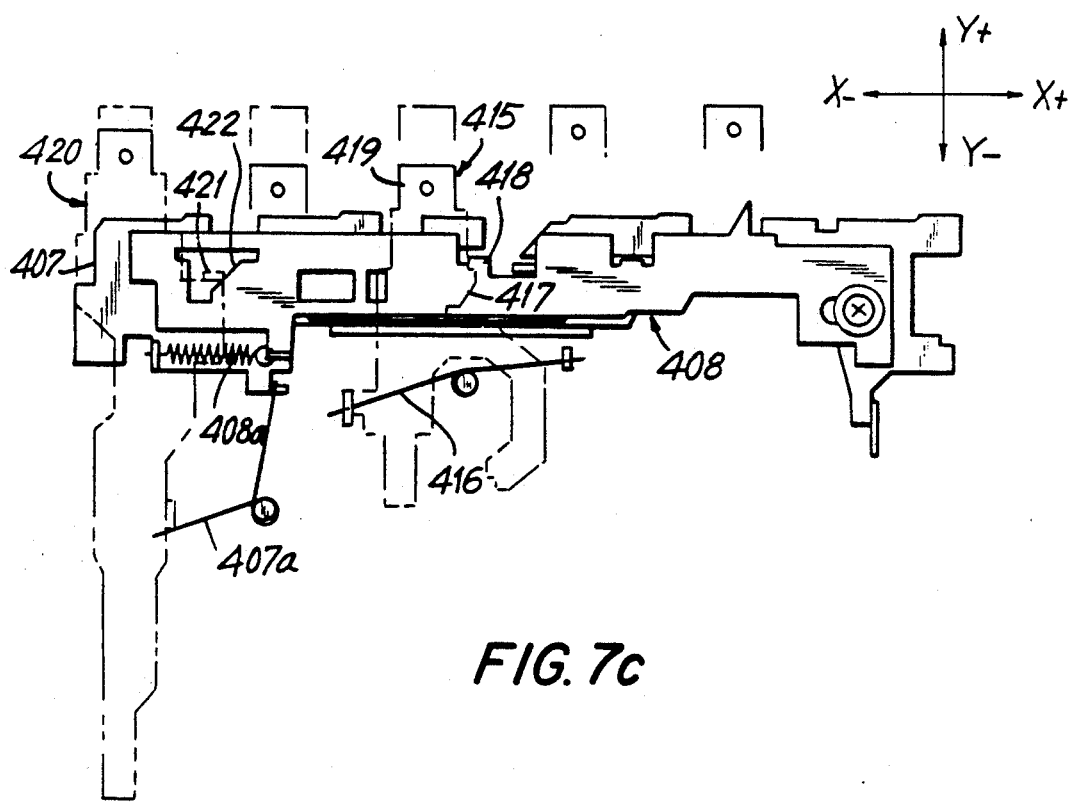

In the play mode, as shown in FIG. 7(c), when rewinding lever 415 is pushed in the direction of arrow $Y_-$ to overcome the spring force of torsion spring 416, the inclined surface of pawl part 417 presses a projection 418 on the upper slide plate 408. The pressure exerted to projection 418 causes upper slide plate 408 to move in the direction of arrow $Y_-$, relative to the lower slide plate 407 to overcome the spring force of coil spring 408a. Therefore, pawl part 417 is engaged with projection 418 to lock rewinding lever 415. Rewinding lever 415 has an engaging piece 405 onto which rewinding push button top 220c is fitted. By sliding rewinding lever 415 in the direction of arrow $Y_-$, pressing projection S on rewinding push button top 220c shown in FIG. 6 presses one of the contact pieces of leaf switch 310b and opens leaf switch 310b.

When leaf switch 310b is open, as shown in FIG. 5, the inter-tune gap detecting circuit 320 is energized. During reproducing and rewinding modes, the reproduced vocal sound signal and the reproduced music tune signal are inputted to inter-tune gap detecting circuit 320. Inter-tune gap detecting circuit 320 detects a non-signal or low level condition between adjacent songs. When a non-signal or low condition is detected, inter-tune gap detecting signal 320 supplies the trigger signal (inter-tune gap detection signal) to motor stopping circuit 340. When the inter-tune gap detection signal is supplied to motor stopping circuit 340, the rotation of electronic governor motor M for driving a reel is stopped. Simultaneously, detection completion sound generating circuit 330 supplies an information signal or an artificial voice signal to power amplifying device 70a through resistor $R_8$, applying the inter-tune gap detection signal as a trigger signal. Accordingly, the information signal or the artificial voice signal is outputted from speaker 80.

In conventional systems, when the inter-tune gap detecting signal is detected, a conventional tape recorder converts this signal into a mechanical drive force by means of a solenoid plunger of the like so as to actuate a release lever. The solenoid plunger releases play lever 404 or rewinding lever 415, thereby stopping motor M. To start the solenoid plunger, several amperes of current are quickly consumed. In some conventional tape recorders, the rewinding mode is electrically locked, consuming a large amount of power.

Automatic intro-scan operation circuit 310, however, stops motor M through motor stopping circuit 340, that is, by interrupting the power supply to motor M. In this manner, a large current necessary for driving the mechanism of the tape deck for releasing the push buttons is eliminated. In accordance with the invention, power consumption of the battery for powering the motor (especially during the rewind mode) and the speaker is carefully conserved to extend its life span. The intro-scan operation is achieved without resort to releasing of depressed switches through use of a solenoid plunger. The need to frequently replace batteries is avoided.

Figure 7D:
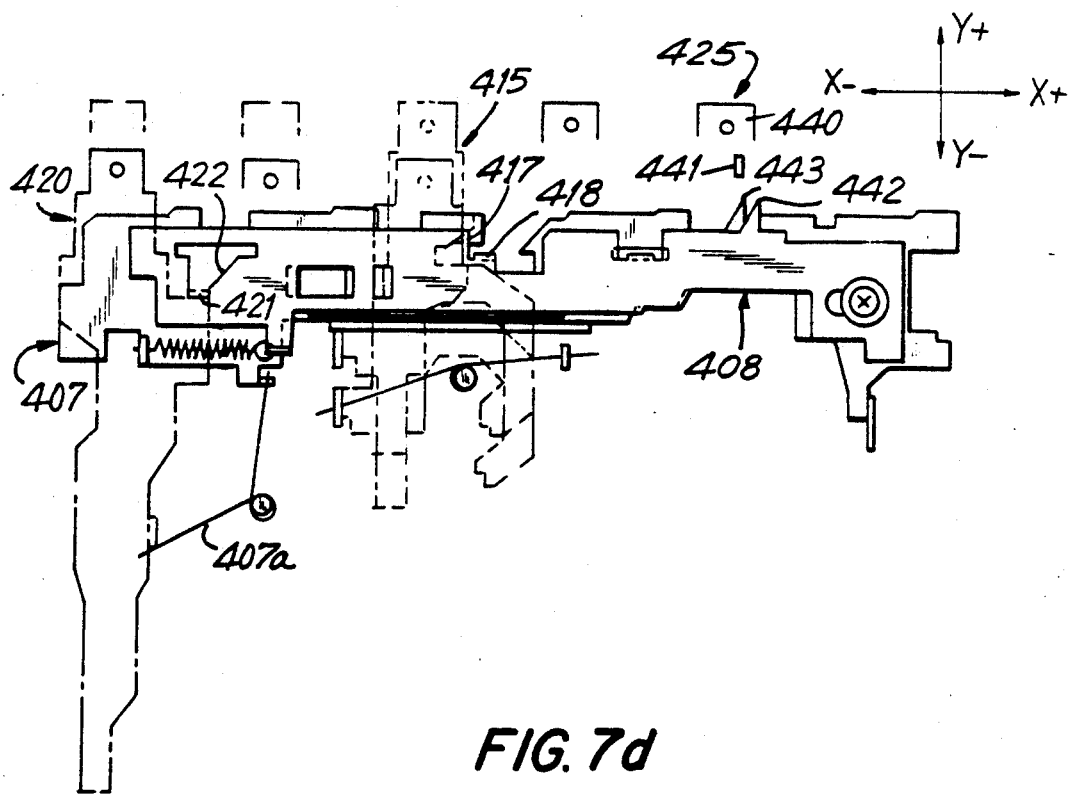
Figure 7E:
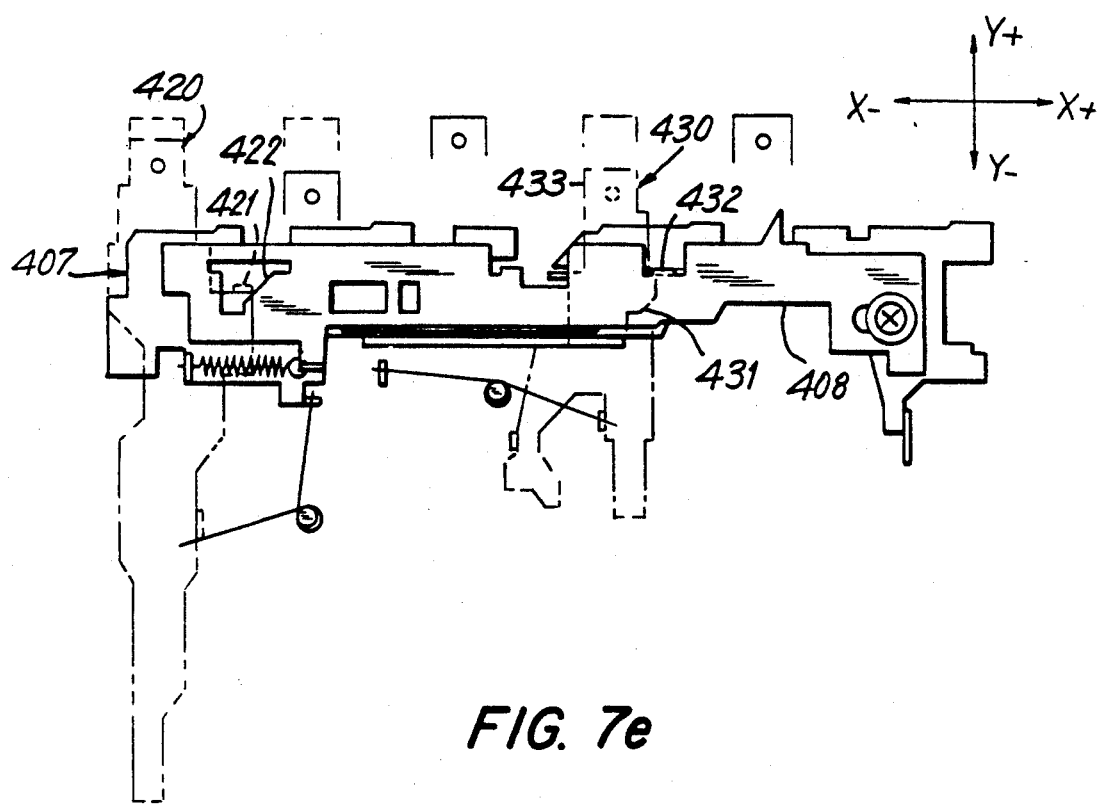

When information (e.g. artificial voice) indicating the completion of the intro-scan operation is outputted from speaker 80, the user may push start lever 420 shown in FIG. 7(c) in the direction of arrow $Y_-$. The pressing of start lever 420 overcomes the spring force of torsion spring 407a. A projection 421 is then pressed against an inclined part of opening 422 in upper slide part 408 to move upper slide plate 408 in the direction of arrow $X_+$. Accordingly, the engagement between pawl part 417 and projection 418 is released. Therefore, as shown in FIG. 7(d), rewinding lever 415 is returned in the direction of arrow $Y_+$ to release the lock condition.

When rewinding lever 415 is returned in the direction of the arrow $Y_+$, pressing projection S moves away from one of the contact pieces of leaf switch 310b. Accordingly, leaf switch 310b is returned to a closed condition during normal operation. Since state selection terminal 320a of inter-tune gap detecting circuit 320 is at ground potential, inter-tune gap detecting circuit 320 is shifted into the inactive condition. Further, the stopping action of motor stopping circuit 340 is released. Motor M is again rotated to retrieve the play mode. After completion of the intro-scan operation, the mode is shifted into play mode by pushing start lever 420. It is not necessary to manipulate the push-in operation of play lever 404 immediately after the push-in operation of release lever 425. Accordingly, initiating the start operation after completion of the intro-scan operation can be simply achieved.

Information such as, but not limited to, an artificial voice provided by speaker 80, after initiating the rewind mode (caused by the push-in operation of rewinding lever 415) indicates that a gap between the present and previous song has been detected (e.g. heading of the previous music tune detected). When start lever 420 is no longer depressed, start lever 420 is automatically returned to the position shown in FIG. 7(b) by the spring force of torsion spring 407a. Accordingly, the play mode is once again begins. Start lever 420 has an engaging piece 428 onto which start push button top 220e is fitted.

Figure 7F:
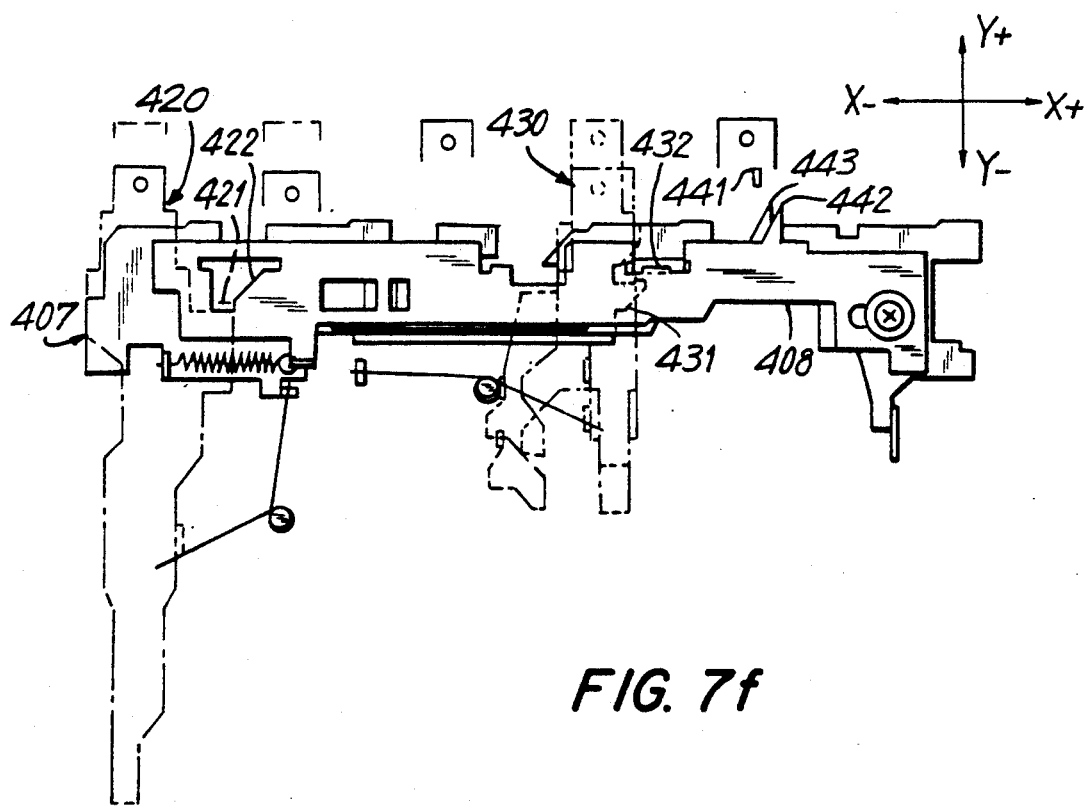

When fast-feed lever 420 is pushed in the direction of arrow $Y_-$ to overcome the spring force of torsion spring 416 from the reproducing condition shown in FIGS. 7(c) and 7(f), an inclined part of pawl part 431 presses a projection 432 on upper slide plate 408. This motion causes upper slide plate 408 to move in the direction of arrow $Y_+$ to overcome the spring force of coil spring 406 relative to lower spring 407. Therefore pawl part 431 engages with projection 432 so that fast-feed lever 430 is locked. Fast-feed lever 430 has an engaging piece 433 onto which the fast-feed push button top 220b is fitted. During the process of sliding fast-feed lever 430 in the direction of arrow $Y_+$, pressing projection T on fast-feed button top 220b shown in FIG. 6 presses one of contact pieces of leaf switch 310a causing the opening of leaf switch 310a.

When leaf switch 310a is open, similar to opening leaf switch 310b, inter-tune gap detecting circuit 320 is energized to carry out the automatic intro-scan operation.

After the information sound (e.g. artificial voice) is outputted from speaker 80, start lever 420 is pushed in the direction of arrow $Y_-$. This movement overcomes the spring force of torsion spring 407a. Then, projection 421 presses the inclined part of opening 422 in upper slide plate 408 to move upper slide plate 408 in the direction of arrow $X_+$. Engagement between pawl part 431 and projection 432 is released and fast-feed lever 430 is returned in the direction of arrow $Y_+$, as shown in FIG. 7(f) to release the lock condition. When fast-feed lever 430 is returned in the direction of arrow $Y_+$, pressing projection T moves away from one of the contact pieces of leaf switch 310a to close leaf switch 310a.

Therefore, state selection terminal 320a of inter-tune gap detecting circuit 320 is at a ground potential so that inter-tune gap detecting circuit 320 is shifted to the deenergized state. The output of information sound or artificial voice sound caused by the push-in operation of fast-feed lever 430 supplies information to the intro-scan operation including the lead of the next musical signal. In this manner, jumping (skipping) over a song can be achieved. When the pressure against start lever 420 is released, start lever 420 is automatically returned to the condition shown in FIG. 7(b) by the spring force of torsion spring 407a. Accordingly, the play mode once again begins. Start lever 420 has an engaging piece 428 onto which the start push button top 220e is fitted.

Release lever 425 has an engaging piece 440 onto which the release push button top 220a is fitted. Release lever 425 is urged in the direction of arrow $Y_+$ by the spring force of a torsion spring (not shown). Further, release lever 425 has a projection 441. Upper slide plate 408 and lower slide plate 407 have pawl parts 442, 443 against which projection 441 abuts, as shown in FIGS. 7(d) and 7(f). When release lever 425 is pushed in the direction of arrow $Y_-$ during play mode, projection 441 presses pawl parts 442, 443 against which projection 441 abuts. This pressure moves upper slide plate 408 and lower slide plate 407 in the direction of arrow $X_+$. Pawl part 414 releases the lock condition of play lever 404. Further, projection 441 on release lever 425 abuts against pawl parts 442, 443 to release the fast-feed condition and the rewinding condition, respectively, during the non-reproducing mode.

As can now be readily appreciated, a miniature portable audio apparatus having a speaker, a vocal sound reproducing device, a gripping section and a vocal sound input section is provided. The speaker is stored in a casing body in a first position in the apparatus. In addition, the other parts of the vocal sound reproducing device are disposed in the casing body. The gripping section is provided with a plurality of parts which are integrally coupled to form the casing. The vocal sound input section is coupled to the gripping section and the casing at a second position. In this arrangement, the vocal sound input section is arranged at a specified distance from the speaker to prevent howling.

In accordance with the invention, the portable audio apparatus includes a vocal sound reproducing device having a sound multiplex reproducing device. The sound multiplex reproducing device includes a vocal sound reproducing circuit and a music tune reproducing circuit in order to provide the singing accompaniment function. The audio apparatus further includes a mixing and amplifying device, a signal intensity changing device and a signal intensity setting device. The mixing and amplifying device mixes a vocal sound reproduction signal from the vocal sound reproducing circuit and a music tune reproduction signal from the tune reproducing circuit and then amplifies the mixed signals. The signal intensity changing device changes at least the intensity of a vocal sound reproduction signal supplied to the mixing and amplifying device in association with external manipulation. Further, the signal intensity setting device disables the signal intensity changing means based on external manipulation. The signal intensity device sets the intensity of the vocal sound reproduction signal fed to the mixing and amplifying device at a predetermined value.

The signal intensity changing device adjusts the intensity of the vocal sound reproduction signal to set a balance between a vocal sound volume and a music tune sound volume. In this manner, when recorded vocals are introduced through the vocal sound input section, an increased sound is obtained by adjusting the volume of the recorded lyrics. The recorded lyrics and tune are mixed and outputted from the speaker. By decreasing the volume of the recorded vocal signal through the signal intensity changing device, the user can sing along with his voice mixed with the reproduced song and outputted along with reproduced song through the speaker. A person who forgets the lyrics of a song or has no self-confidence to continue singing would activate the signal intensity setting device to reset the volume balance between the recorded lyrics and tune so that the listener can sing along by listening to the recorded lyrics. In resetting the volume balance, the signal intensity adjusting device for adjusting the intensity of a vocal sound reproduction signal is disabled. The volume of the recorded vocal sound reproduction signal can then be reset to a predetermined value. The voice of the user can also be produced by the speaker. Therefore, the person singing can continue to sing while playing the song.

The signal intensity changing device includes a first signal intensity attenuating circuit for variably attenuating the volume of the vocal sound reproduction signal and a second signal intensity attenuating circuit for attenuating the volume of the recorded music tune signal reproduction signal prior to being supplied to the mixing and amplifying device. Preferably, the attenuation circuitry is constructed from single variable resistor to reduce the number of components.

The signal intensity setting device includes a switch for interrupting signal attenuation by at least the first signal attenuating circuit. In the preferred embodiment, the switch is connected in series to a slider of a single variable resistor acting as a signal intensity changing device. If the switch device is formed from a push button type, the top of the push button is desirably positioned on the gripping section or in an area in the vicinity of the grip section. The thumb of the user can easily manipulate the push button which enhances the manipulatability of the apparatus.

To decrease the consumption of power from the battery to release the lock of the mechanism system upon completion of a tune intro-scan operation, the apparatus also includes an initiation signal generating circuit for generating a signal for initiating a tune intro-scan operation at the timing of a high speed forward feed operation or a rearward feed operation, an intertune gap detecting circuit for detecting a non-signal or low level condition of a reproduced song and a motor stopping circuit for interrupting the supply of power to a drive motor.

In a conventional arrangement, the lock condition mechanism system for a high speed forward feed operation and high speed rearward feed operation is forcibly released by a solenoid plunger or the like when an intertune gap detecting signal is delivered by pressing a push button. However in the present invention, the mechanism system is held in its lock condition while at the same time the system is turned off. The motor stopping circuit cuts off the supply of power to the drive motor to electrically and directly stop the motor from rotating and drawing power from the battery. Accordingly, no substantial amount of current is consumed for stopping the motor and it is substantially possible to reducing consumption of the power source.

To transmit data to the user at the completion of a tune intro-scan operation, a detection complete sound generating circuit is provided for outputting an alarm sound or an artificial voice from the speaker in accordance with a detection signal produced by the inter-tune gap detecting circuit. The initiation signal generating device includes, for example, an AND circuit having a first switch which opens and closes in association with a high speed forward feed operation and a second switch which opens and closes in association with a rearward feed operation. In the preferred embodiment, the first switch and second switch are leaf type switches.

In addition to a pushing member for each leaf type switch, a projection is provided on the rear side of a push button switch for each selecting mode lever. Although the drive motor is automatically stopped after completion of a tune intro-scan operation, the high speed forward feed or high speed rearward feed operation mechanism is held in a locked condition. Since, the initiation signal generating device is in its active condition. A mechanism is provided for stopping continuation of the initiation signal generation (which initiates a tune intro-scan operation). A start lever is also provided for releasing the locked conditions of a high speed forward feed operation selecting lever, a high speed rearward operating selecting lever and returning the apparatus to a reproducing mode. A push button projecting from the casing body fits onto an engaging piece of the start lever for restarting the reproducing mode through depression of one push button.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A portable audio apparatus including mechanical linkages and apparatus for at least playing a recorded medium having audible sound signals stored thereon comprising:

motor means for moving said recording medium in at least forward fast forward and rearward modes;
   sound reproducing means for audibly reproducing the sound signals stored on said recording medium;

detecting means operable for determining and for producing an output signal when a gap of at least a predetermined duration in the sound signals reproduced by said sound reproducing means is detected, such a gap being represented by a period when the sound signals are below a predetermined level or absent, said detecting means not being responsive to a control signal, if any, on said recording medium; and control means for controlling the supply of power to said motor means in response to said output signal of said detecting means without acting upon any of the mechanical linkages and apparatus.

2. The portable audio apparatus of claim 1, further including start switching means for initiating operation of said detecting means based on said motor means moving said recording medium in either fast forward or rearward modes.

3. The portable audio apparatus of claim 1, further including a housing for supporting said sound reproducing means within said housing, speaker means for producing an audio signal based on said output signal and disposed at a first position within said housing, sound input means for receiving sound waves, connected to said housing at a second position and distanced from said speaker means to prevent howling by the latter, and gripping means attached to said housing for holding said portable audio apparatus with at least one hand of a user.

4. The portable audio apparatus of claim 2, further including a housing for supporting said sound reproducing means within said housing, speaker means for producing an audio signal based on said output signal and disposed at a first position within said housing, sound input means for receiving sound waves, connected to said housing at a second position and distanced from said speaker means to prevent howling by the latter, and gripping means attached to said housing for holding said portable audio apparatus with at least one hand of a user.

5. The portable audio apparatus of claim 2, further including generating means responsive to said output signal for producing an information signal, said speaker means operable for producing a message based on said information signal.

6. The portable audio apparatus of claim 4, further including generating means responsive to said output signal for producing an information signal, said speaker means operable for producing a message based on said information signal.

7. The portable audio apparatus of claim 2, wherein said start switching means includes an AND circuit having fast forward switch means for opening and closing based on said motor means moving said recording medium in said fast forward mode and rearward switch means for opening and closing based on said motor means moving said recording medium in said rearward mode.

8. The portable audio apparatus of claim 5, wherein said start switching means includes an AND circuit having fast forward switch means for opening and closing based on said motor means moving said recording medium in said fast forward mode and rearward switch means for opening and closing based on said motor means moving said recording medium in said rearward mode.

9. The portable audio apparatus of claim 6, wherein said start switching means includes an AND circuit having fast forward switch means for opening and closing based on said motor means moving said recording medium in said fast forward mode and rearward switch means for opening and closing based on said motor means moving said recording medium in said rearward mode.

10. The portable audio apparatus of claim 2, wherein said fast forward switch means and said rearward switch means are leaf switches.

11. The portable audio apparatus of claim 8, wherein said fast forward switch means and said rearward switch means are leaf switches.

12. The portable audio apparatus of claim 10, further including a push button switch associated with said fast forward switch means and a push button switch associated with said rearward switch means.

13. The portable audio apparatus of claim 11, further including a push button switch associated with said fast forward switch means and a push button switch associated with said rearward switch means.

14. The portable audio apparatus of claim 12, wherein each push button switch includes projection means for engaging and opening the corresponding leaf switch.

15. The portable audio apparatus of claim 13, wherein each push button switch includes projection means for engaging and opening the corresponding leaf switch.

16. The portable audio apparatus of claim 3, wherein said start switching means includes fast forward switching means operable for being maintained in locked and unlocked positions and for initiating said motor means to move said recording medium in the fast forward mode when in its locked position and rearward switching means operable for being maintained in locked and unlocked positions and for initiating said motor means to move said recording medium in the rearward mode when in its locked position.

17. The portable audio apparatus of claim 5, wherein said start switching means includes fast forward switching means operable for being maintained in locked and unlocked positions and for initiating said motor means to move said recording medium in the fast forward mode when in its locked position and rearward switching means operable for being maintained in locked and unlocked positions and for initiating said motor means to move said recording medium in the rearward mode when in its locked position.

18. The portable audio apparatus of claim 16, wherein said start switching means further includes additional switching means and mechanical means, said mechanical means coupled to said fast forward switching means, said rearward switching means and said additional switching means and responsive to said additional switching means for releasing said fast forward switching means and said rearward switching means from said locked positions to said unlocked positions and for interrupting operation of said detecting means.

19. The portable audio apparatus of claim 17, wherein said start switching means further includes additional switching means and mechanical means, said mechanical means coupled to said fast forward switching means, said rearward switching means and said additional switching means and responsive to said additional switching means for releasing said fast forward switching means and said rearward switching means from said locked positions to said unlocked positions and for interrupting operation of said detecting means.

20. The portable audio apparatus of claim 1, wherein said recording medium is a magnetic tape.

21. The portable audio apparatus of claim 3, wherein said sound input means includes a microphone.

22. The portable audio apparatus of claim 6, wherein said sound input means includes a microphone.

23. A portable audio apparatus for at least playing a recording medium having at least words and/or music stored thereon comprising:
- a motor for moving said recording medium in at least forward, fast forward and rearward modes;
- an input device for receiving vocal sound;
- a sound multiplex reproducing device having a vocal sound reproducing circuit for reproducing vocal sound from said audio input device and a recording medium reproducing circuit for reproducing said at least words and/or music on said recording medium and producing an output signal representing the combination of said reproduced vocal sound and at least words and/or music;
- a gap detection device for detecting a gap of at least a predetermined duration in said output signal, such a gap being represented by a period when the output signal is below a predetermined level or absent, and producing a trigger signal based on said detection, said gap detection device not being responsive to a control signal, if any, on said recording medium; and
- control means for halting the movement of said recording medium by said motor means in response to said trigger signal from said gap detection device.

24. The portable audio apparatus of claim 23, further including a housing for supporting said sound multiplex reproducing device within said housing, a speaker for producing an audio signal based on said output signal and disposed at a first position within said housing, said audio input device being a microphone for receiving vocal sounds from a user connected to said housing at a second position and distanced from said speaker to prevent howling by the latter and a grip attached to said housing disposed between said speaker and said microphone for holding said portable audio apparatus with at least one hand of said user.

25. The portable audio apparatus of claim 24, further including a start switching device having fast forward switch means operable for being maintained in locked and unlocked positions and for initiating said motor means to move said recording medium in the fast forward mode when in its locked position and rearward feed means operable for being maintained in locked and unlocked positions and for initiating said motor means to move said recording medium in the rearward mode when in its locked position and including latch means for holding said start switch device in said locked position even after detection of said gap or reaching the end of the tape and manually operable switch means mechanically coupled to said latch means for permitting the manual release of said start switching device from said locked position to said unlocked position.

26. The portable audio apparatus of claim 25, wherein said start switching device further includes an AND circuit with first leaf switch means and second leaf switch means for respectively controlling operation of said gap detection device based on said recording medium moving in the fast forward and rearward modes.

* * * * *